United States Patent
Li et al.

(10) Patent No.: US 10,049,556 B2
(45) Date of Patent: Aug. 14, 2018

(54) METHOD AND DEVICE FOR POSITIONING OBJECTS

(71) Applicant: Xiaomi Inc., Beijing (CN)

(72) Inventors: Yingjun Li, Beijing (CN); Li Wang, Beijing (CN)

(73) Assignee: XIAOMI INC., Beijing ( * ) Notice: Subject to any disclaimer, the term of this patent is extended or adjusted under 35 U.S.C. 154(b) by 182 days.

(21) Appl. No.: 14/693,870

(22) Filed: Apr. 23, 2015

(65) Prior Publication Data

US 2016/0091594 A1    Mar. 31, 2016

Related U.S. Application Data

(63) Continuation of application No. PCT/CN2015/071254, filed on Jan. 21, 2015.

(30) Foreign Application Priority Data

Sep. 30, 2014 (CN) .......................... 2014 1 0521145

(51) Int. Cl.
*G08B 21/24* (2006.01)
*G01S 5/12* (2006.01)
(Continued)

(52) U.S. Cl.
CPC ............... *G08B 21/24* (2013.01); *G01S 5/12* (2013.01); *G01S 5/14* (2013.01); *G01S 11/06* (2013.01); *G01S 13/74* (2013.01)

(58) Field of Classification Search
CPC . G01S 11/06; G01S 13/74; G01S 5/12; G01S 5/14; G08B 21/24
See application file for complete search history.

(56) References Cited

U.S. PATENT DOCUMENTS 6,456,239 B1 * 9/2002 Werb ..................... G01S 5/02
                                                          235/385
7,395,073 B2 * 7/2008 Gwon ................... H04W 64/00
                                                          455/456.1

(Continued)

FOREIGN PATENT DOCUMENTS

CN        102043151 A      5/2011
CN        102749613 A     10/2012
(Continued)

OTHER PUBLICATIONS

Jiahao Wang et al, "RFID-enabled tracking in flexible assembly line", The International Journal of Advanced Manufacturing Technology, Jun. 1, 2009, pp. 351-360, vol. 46, No. 1-4, Springer, Berlin, DE.

(Continued)

*Primary Examiner* — Nay Tun
(74) *Attorney, Agent, or Firm* — Jun He Law Offices P.C.; James J. Zhu

(57) ABSTRACT

The present disclosure discloses a method for positioning an object in a positioning device and the positioning device thereof. The method comprises: transmitting a beam according to a preset mode; receiving a feedback signal sent from an object, wherein the feedback signal is a signal sent by an electronic tag on the object after receiving the beam, and the feedback signal correlates to an intensity of the beam when the electronic tag receives the beam; and determining a position of the object relative to the positioning device according to the feedback signal. Accordingly, the problem of cumbersome operation and poor reliability of manually recording storing locations of objects on a logbook by a user can be solved, and the effect of improving the convenience for positioning object can be achieved.

7 Claims, 11 Drawing Sheets

(51) Int. Cl.
*G01S 5/14* (2006.01)
*G01S 11/06* (2006.01)
*G01S 13/74* (2006.01)

(56) References Cited

U.S. PATENT DOCUMENTS

| | | | |
|---|---|---|---|
| 2002/0183071 A1* | 12/2002 | Shioda | G01S 5/021 455/456.1 |
| 2003/0080992 A1 | 5/2003 | Haines | |
| 2004/0248589 A1* | 12/2004 | Gwon | G01S 5/0252 455/456.1 |
| 2005/0020279 A1 | 1/2005 | Markhovsky et al. | |
| 2005/0035862 A1* | 2/2005 | Wildman | A61B 5/1113 340/573.1 |
| 2008/0032705 A1* | 2/2008 | Patel | H04W 4/18 455/456.1 |
| 2009/0239550 A1* | 9/2009 | Myers | G01S 5/14 455/456.1 |
| 2010/0225480 A1* | 9/2010 | Bloy | G01S 5/0215 340/572.1 |
| 2011/0018769 A1* | 1/2011 | Misikangas | G01S 5/0072 342/451 |
| 2012/0019362 A1* | 1/2012 | Arumugam | G01S 5/12 340/10.1 |
| 2013/0214907 A1 | 8/2013 | Bloy et al. | |

FOREIGN PATENT DOCUMENTS

| | | |
|---|---|---|
| DE | 202010006043 U1 | 7/2010 |
| JP | 2004184078 A | 7/2004 |
| JP | 2009047583 A | 3/2009 |
| JP | 2009187250 A | 8/2009 |
| JP | 2013058167 A | 3/2013 |
| KR | 20110023486 A | 3/2011 |
| RU | 2343100 C1 | 1/2009 |
| RU | 2351945 C1 | 4/2009 |
| RU | 2378661 C1 | 1/2010 |

OTHER PUBLICATIONS

Partial European Search Report of EP 15187713.1, dated Dec. 4, 2015.
Extended European Search Report of EP 15187713.1, dated Apr. 22, 2016.
International Search Report of PCT/CN2015/071254, dated Apr. 7, 2016.
Jiahao Wang et al., "RFID-enabled tracking in flexible assembly line", Int J Adv Manuf Technol (2010), Springer, Berlin, DE, vol. 46, pp. 351-360, Jun. 1, 2009.
Juyun Zhao, "Trilateration Positioning Algorithm", Master's Thesis, published on Apr. 20, 2012.

* cited by examiner

Fig. 3A

A previous transmitting direction is deflected at a predetermined angle toward a predetermined direction at predefined time intervals so as to acquire a current transmitting direction, a beam is transmitted at a beam angle according to the transmitting direction, and the transmission of the beam may not stop until receiving the feedback signal or until the current transmitting direction is the same as an initial transmitting direction. — 301

When the feedback signal is received, the transmitting direction of the beam currently transmitted by the positioning device is determined, and the direction of the object relative to the positioning device is determined according to the transmitting direction. — 302

The distance between the object and the positioning device is calculated according to beam intensity correlating to the feedback signal. — 303

Fig. 3B

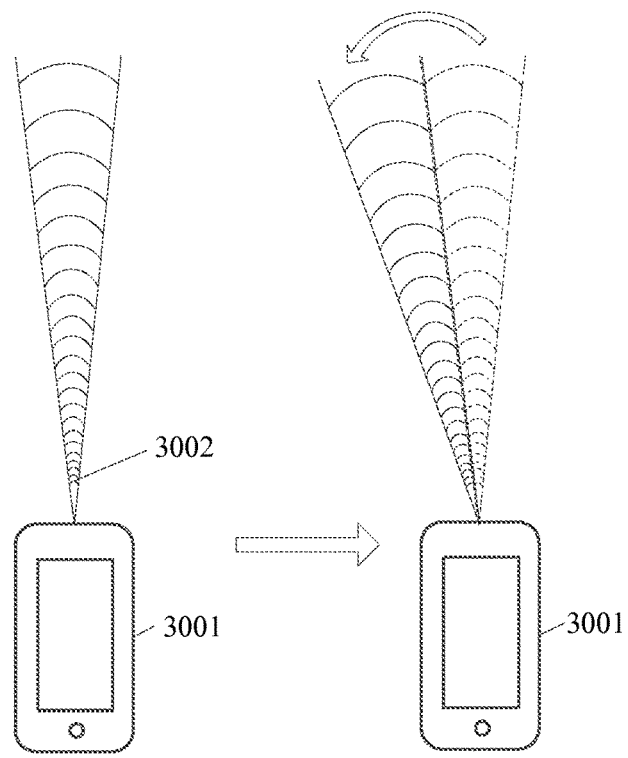

ns; the processor is configured to perform: transmitting the beam according to a preset mode; receiving a feedback signal sent from the object, wherein the feedback signal is a signal sent by the electronic tag on the object after receiving the beam, and the feedback signal correlates to an intensity of the beam when the electronic tag receives the beam; and determining a position of the object relative to the positioning device according to the feedback signal.

METHOD AND DEVICE FOR POSITIONING OBJECTS

CROSS-REFERENCE TO RELATED APPLICATIONS

This application is a Continuation Application of International Application PCT/CN2015/071254, with an international filing date of Jan. 21, 2015, which is based on and claims priority to Chinese Patent Application No. 201410521145.6, filed on Sep. 30, 2014, the entire contents of which are incorporated herein by reference.

TECHNICAL FIELD

The present disclosure generally relates to the field of wireless communication, and more particularly, to a method for positioning an object in a positioning device and the positioning device thereof.

BACKGROUND

In daily life, users often cannot locate house keys, wallets or articles that they have tidied long time ago, which causes great inconveniences to the users' life.

In order to efficiently search for the required articles, the users may manually record storing locations of the articles on a logbook so as to locate the articles. For example, a user manually records the location for storing an article when it is stored, thus, when the user wants to find the article, the user only need to search the location for storing the article according to the record on the logbook.

SUMMARY

The present disclosure provides a method for positioning an object in a positioning device and the positioning device thereof. The technical solution is as follows.

According to a first aspect of the embodiments of the present disclosure, a method for positioning an object in a positioning device is provided. The method comprises: transmitting a beam according to a preset mode; receiving a feedback signal sent from an object, wherein the feedback signal is a signal sent by an electronic tag on the object after receiving the beam, and the feedback signal correlates to an intensity of the beam when the electronic tag receives the beam; and determining a position of the object relative to the positioning device according to the feedback signal.

According to a second aspect of the embodiments of the present disclosure, a positioning device is provided. The positioning device comprises: a processor; and a memory configured to store processor-executable instructions; the processor is configured to perform: transmitting a beam according to a preset mode; receiving a feedback signal sent from an object, wherein the feedback signal is a signal sent by an electronic tag on the object after receiving the beam, and the feedback signal correlates to an intensity of the beam when the electronic tag receives the beam; and determining a position of the object relative to the positioning device according to the feedback signal.

According to a third aspect of the embodiments of the present disclosure, a positioning system is provided. The system comprises an electronic tag and at least one positioning device, wherein the electronic tag is provided on an object to receive a beam sent from the positioning device, and the positioning device comprises: a processor; and a memory configured to store processor-executable instruc- The technical solution according to embodiments of the disclosure may have the following beneficial effects:

By transmitting the beam according to the preset mode, and receiving the feedback signal sent from the object, and then by determining the position of the object relative to the positioning device according to the feedback signal, the object can be positioned by means of the positioning device, thus, the problem of cumbersome operation and poor reliability of manually recording storing locations of objects on a logbook by a user can be solved, and the effect of improving the convenience for positioning object can be achieved.

It will be appreciated that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 3A is a flow chart illustrating a positioning method according to another exemplary embodiment.

FIG. 3B is a schematic diagram illustrating that a beam is transmitted out from a positioning device according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise specified. The implementations set forth in the following description of exemplary embodiments do not cover all implementations consistent with the disclosure. Instead, they are merely examples of apparatuses and methods consistent with aspects related to the disclosure as recited in the appended claims.

Figure 1:
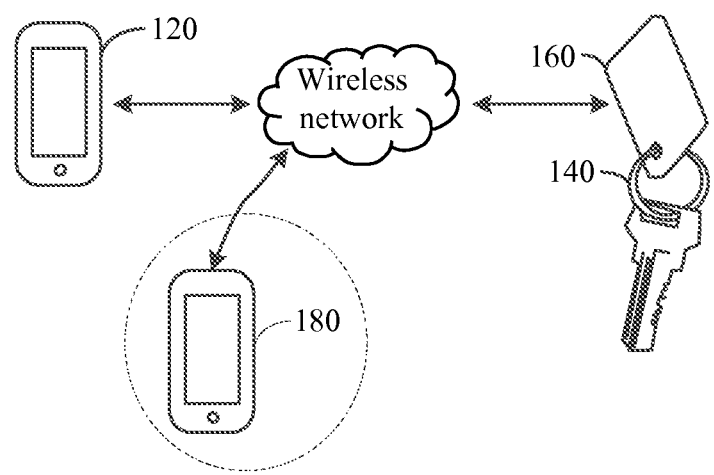
FIG. 1 is a schematic diagram illustrating an implementation environment involved in a positioning method according to parts of exemplary embodiments.

FIG. 1 is a schematic diagram illustrating an implementation environment involved in a positioning method according to parts of exemplary embodiments. As shown in FIG. 1, the implementation environment may include at least one positioning device 120 and an object 140.

The positioning device 120 may be an electronic equipment provided with a positioning module. The electronic equipment may be a smart mobile phone, a tablet computer, a smart television, an e-book reader, a router, a multimedia player, a laptop portable computer, a desktop computer or the like.

The positioning device 120 may be connected to the object 140 through a wireless network such as Wi-Fi (Wireless-Fidelity) and Bluetooth, etc.

The object 140 may be an article provided with an electronic tag 160 which may be a passive tag or an active tag.

The implementation environment may also include a positioning device 180, and the positioning device 120 may be combined together with the positioning device 180 for positioning the object 140.

Figure 2:
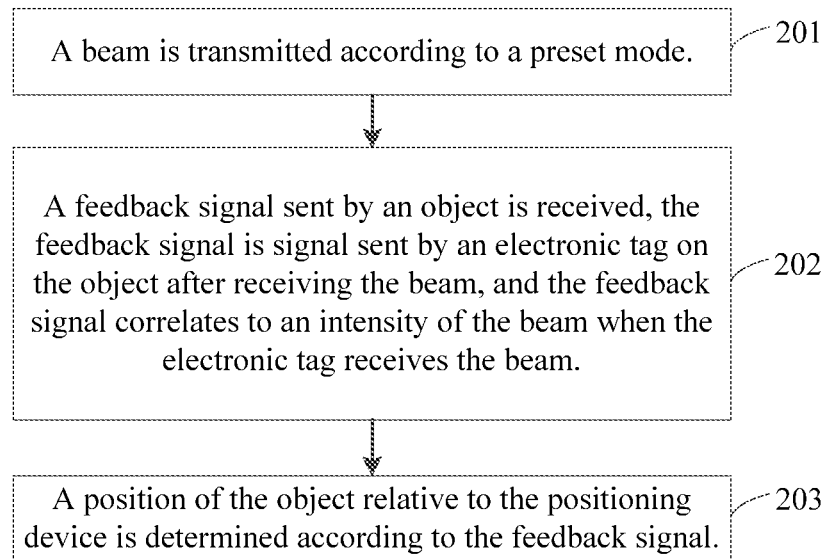
FIG. 2 is a flow chart illustrating a positioning method according to an exemplary embodiment.

FIG. 2 is a flow chart illustrating a positioning method according to an exemplary embodiment. As shown in FIG. 2, the positioning method is applied to the positioning device 120 in the implementation environment as shown in FIG. 1. The positioning method includes the following steps.

In Step 201, a beam is transmitted according to a preset mode.

In Step 202, a feedback signal sent by an object is received, the feedback signal is a signal sent by an electronic tag on the object after receiving the beam, and the feedback signal correlates to an intensity of the beam when the electronic tag receives the beam.

In Step 203, a position of the object relative to the positioning device is determined according to the feedback signal.

In summary, according to the positioning method provided by the embodiment of the present disclosure, a position of an object relative to a positioning device is determined by transmitting a beam according to a preset mode, receiving a feedback signal sent by the object, and determining the position according to the feedback signal; since articles are positioned by means of the positioning device, thus the problem of cumbersome operation that users need to manually record storing locations of the articles on a logbook can be solved, and the effect of improving the convenience and reliability for positioning objects can be achieved.

In a usage scenario, users may employ a positioning device to position an object conveniently and quickly. Please refer to following embodiments for specific implementation.

FIG. 3A is a flow chart illustrating a positioning method according to another exemplary embodiment. As shown in FIG. 3A, the positioning method is applied to the positioning device 120 in the implementation environment as shown in FIG. 1. The positioning method includes the following steps.

In Step 301, a previous transmitting direction is deflected by a predetermined angle towards a predetermined direction at predefined time intervals so as to acquire a current transmitting direction, a beam is transmitted at a beam angle according to the transmitting direction, and the transmission of the beam may not stop until the feedback signal is received or until the current transmitting direction is the same as an initial transmitting direction.

An initial transmitting direction is determined at the time of transmitting a beam, and a previous transmitting direction is deflected by a predetermined angle toward a predetermined direction at predefined time intervals so as to acquire a current transmitting direction. The predetermined direction may be a clockwise direction or an anti-clockwise direction. The angle difference between the transmitting directions of each two adjacent transmissions is the same.

Alternatively, the predetermined angle may be the beam angle of a beam.

When the predetermined angle is the beam angle of a beam, a previous transmitting direction is deflected by a predetermined angle toward a predetermined direction so as to acquire a current transmitting direction, i.e., it may be interpreted as below: the i-th transmitting direction is determined during transmitting a beam at the i-th time, herein when i>1, the angle difference between the i-th transmitting direction and the (i−1)-th transmitting direction is equal to the beam angle of the beam, and the i-th transmitting direction is at a predetermined side of the (i−1)-th transmitting direction. Herein, i is a natural number greater than 0.

Generally, the shape of a transmitted beam is a sector, and the beam angle is the central angle of the sector. In practical application, in order to ensure positioning accuracy, the beam angle of a beam may be set to be relatively small (for example, 3° or 5°); the smaller a beam angle is, the higher a positioning accuracy is. It should be noted that the size of a beam angle is not limited in the embodiment. However, in order to shorten the positioning time, a relatively large beam angle of a beam may also be set. Therefore, in actual positioning process, a beam angle with a suitable size may be determined in combination with positioning accuracy and positioning time.

When a beam is transmitted at the first time, any direction may be selected as a transmitting direction to transmit the beam. Alternatively, the forward direction of a positioning device may be selected as the transmitting direction for transmitting a beam at the first time.

During scanning, the transmitting direction may be adjusted clockwise or anticlockwise. For example, when the beam is transmitted at the second time, the transmitting direction may be determined on the basis of the beam transmitted at the first time. The transmitting direction may be on the left side (i.e., adjusting the transmitting direction anticlockwise) or the right side (i.e., adjusting the transmitting direction clockwise) of the transmitting direction of the first time.

If the transmitting direction of the second time is determined to be a predetermined side of the transmitting direction of the first time, all the transmitting directions of the following beams transmitted after the second time are determined at the predetermined side of the transmitting direction of the previous time. That is to say, if the transmitting direction of the second time is determined to be on the left side of the transmitting direction of the first time, all the transmitting directions of the following beams to be transmitted after the second time are determined to be on the left side of the transmitting direction of the previous time, for example, the transmitting direction of the third time is determined to be on the left side of the transmitting direction of the second time, and the transmitting direction of the fourth time is determined to be on the left side of the transmitting direction of the third time. If the transmitting direction of the second time is determined to be on the right side of the transmitting direction of the first time, all the transmitting directions of the following beams to be transmitted after the second time are determined to be on the right side of the transmitting direction of the previous time, for example, the transmitting direction of the third time is determined to be on the right side of the transmitting direction of the second time, and the transmitting direction of the fourth time is determined to be on the right side of the transmitting direction of the third time.

Alternatively, the beam angle of each transmitted beam is the same in size, and the angle difference between the transmitting direction of a beam transmitted at the second time and the transmitting direction of the beam transmitted at the first time is equal to the beam angle of the beam, i.e., one side of the sector corresponding to the beam transmitted at the second time is coincident with one side of the sector corresponding to the beam transmitted at the first time.

For example, please refer to FIG. 3B, which is a schematic diagram illustrating a beam is transmitted out from a positioning device according to an exemplary embodiment. As shown in FIG. 3B, when a positioning device 3001 transmits a beam at the first time, it transmits a beam with a beam angle 3002 forwardly. When transmitting the beam at the second time, the positioning device determines the transmitting direction to be on the left side of the transmitting direction of the first time and transmits a beam with also the beam angle 3002 along the transmitting direction. Moreover, the right side of the sector corresponding to the beam transmitted at the second time is coincident with the left side of a sector corresponding to the beam transmitted at the first time.

Alternatively, at the time of transmitting a beam, in order to ensure positioning an object, a positioning device may conduct an omni-directional scanning (i.e. a 360° scanning) according to the transmitted beam, i.e., at the time of transmitting a beam, a previous transmitting direction is deflected by a predetermined angle toward a predetermined direction at predefined time intervals so as to acquire a current transmitting direction, a beam is transmitted along the current transmitting direction and the transmission of the beam may not stop until the current transmitting direction is the same as an initial transmitting direction. Alternatively, since an article being positioned may send a feedback signal, it is also possible to stop transmitting the beam upon receiving the feedback signal.

After determining a transmitting direction, a positioning device transmits a beam with a beam angle outward along the transmitting direction.

In Step 302, when the feedback signal is received, the transmitting direction of the beam currently transmitted by the positioning device is determined, and the direction of the object relative to the positioning device is determined according to the transmitting direction.

The object is provided with an electronic tag which may feedback, after receiving a beam transmitted by the positioning device, a corresponding feedback signal to the positioning device according to the intensity of the received beam. The electronic tag may be an active tag or a passive tag, to which the embodiment makes no restriction.

After receiving the feedback signal, the positioning device stops transmitting beams outward and determines the transmitting direction of the beam transmitted at the last time as the direction of an object to be positioned. It should be noted that a direction determined by the positioning device is a direction relative to the positioning device, for example, 1 o'clock direction, 3 o'clock direction or 6 o'clock direction of the positioning device.

Apparently, after receiving the feedback signal, the positioning device may also continue transmitting a beam outward, but it is necessary to determine the direction of an object to be positioned to be the corresponding transmitting direction when the feedback signal is received.

In Step 303, the distance between the object and the positioning device is calculated according to beam intensity correlating to the feedback signal.

The electronic tag may feedback a corresponding feedback signal to the positioning device according to the intensity of a received beam, and the intensity of a beam may diminish gradually during propagation, i.e., the greater the propagation distance is, the lower the beam intensity is. In other words, the beam intensity is inversely proportional to the propagation distance. Therefore, the positioning device may calculate, according to the beam intensity correlating to the feedback signal, the distance between the object and the positioning device.

After acquiring the direction of the object relative to the positioning device and the distance between the object and the positioning device, the positioning device may combine the direction of the object relative to the positioning device with the distance between the object and the positioning device, and acquire a relative position of the object relative to a certain direction of the positioning device.

Figure 3C:
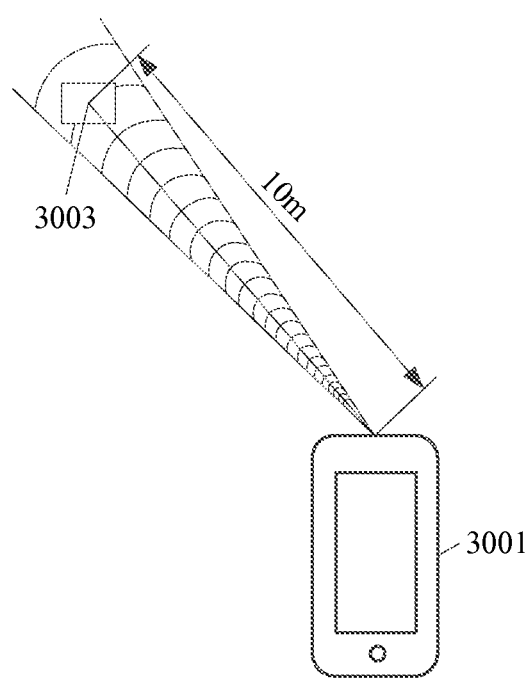
FIG. 3C is a schematic diagram illustrating that an object is positioned by a positioning device according to an exemplary embodiment.

For example, please refer to FIG. 3C, which is a schematic diagram illustrating that an object is positioned by a positioning device according to an exemplary embodiment. As shown in FIG. 3C, after combining the direction of an object 3003 acquired relative to the positioning device 3001 with the distance between the object 3003 and the positioning device 3001, the positioning device 3001 obtains that the object 3003 is 10 meters at the front left of the positioning device 3001.

In summary, according to the positioning method provided by embodiments of the present disclosure, the position of an object relative to a positioning device is determined by transmitting a beam according to a preset mode, receiving a feedback signal sent by the object, and determining the position according to the feedback signal; since articles are positioned by means of the positioning device, thus the problem of cumbersome operation that users need to manually record storing locations of the articles on a logbook can be solved, and the effect of improving the convenience and reliability for positioning objects can be achieved.

In a usage scenario, users may employ at least two positioning devices to position an object more accurately. Please refer to following embodiments for specific implementation.

Figure 4A:
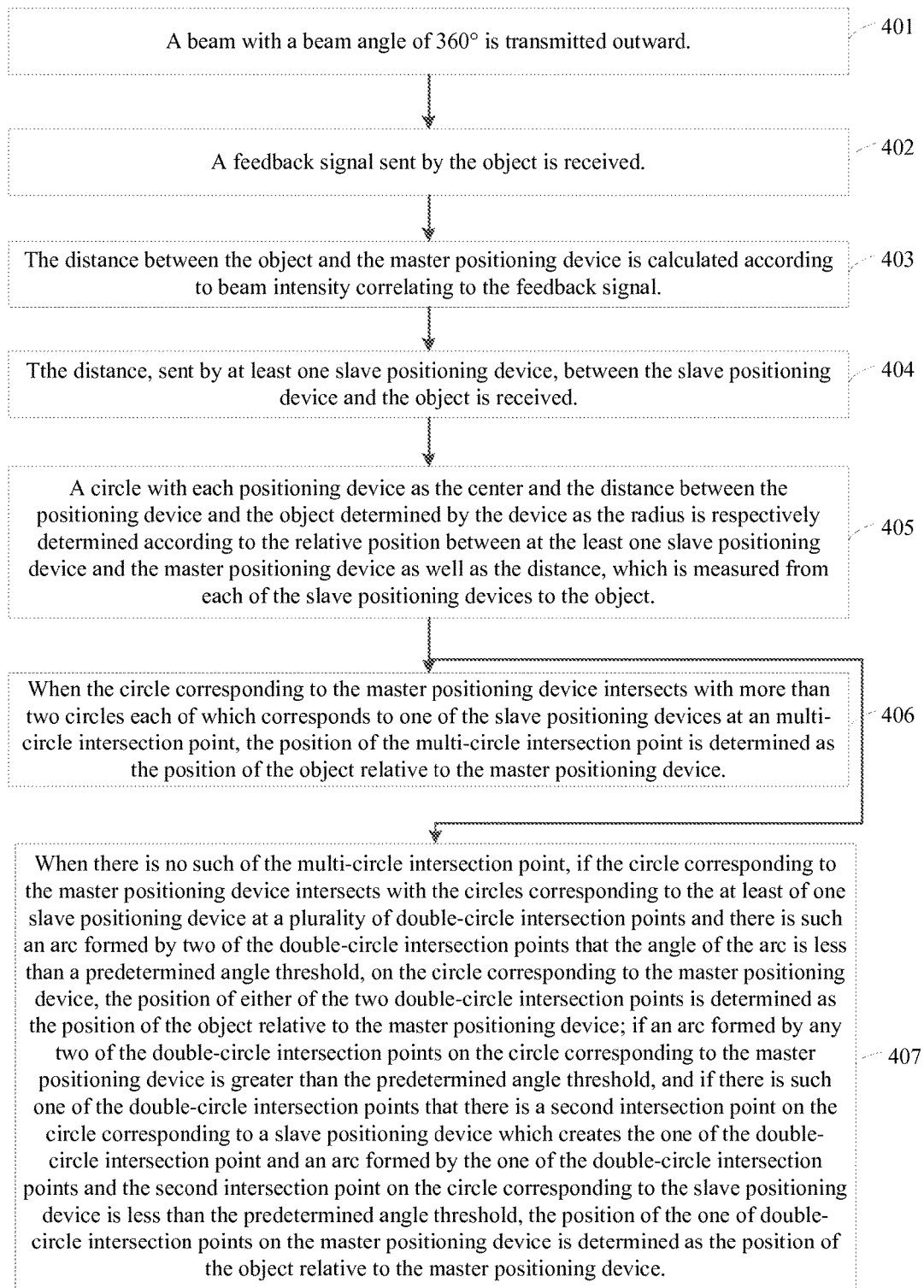
FIG. 4A is a flow chart illustrating a positioning method according to a further exemplary embodiment.

FIG. 4A is a flow chart illustrating a positioning method according to a further exemplary embodiment. As shown in FIG. 4A, the positioning method is applied to the positioning device 120 in the implementation environment as shown in FIG. 1. The positioning device 120 is a master positioning device among a plurality of positioning devices, and the rest of participating positioning devices are slave positioning devices. The method includes the following steps.

In Step 401, a beam with a beam angle of 360° is transmitted outward.

When positioning an object, at least three positioning devices transmit beams outward with a beam angle of 360°.

Figure 4B:
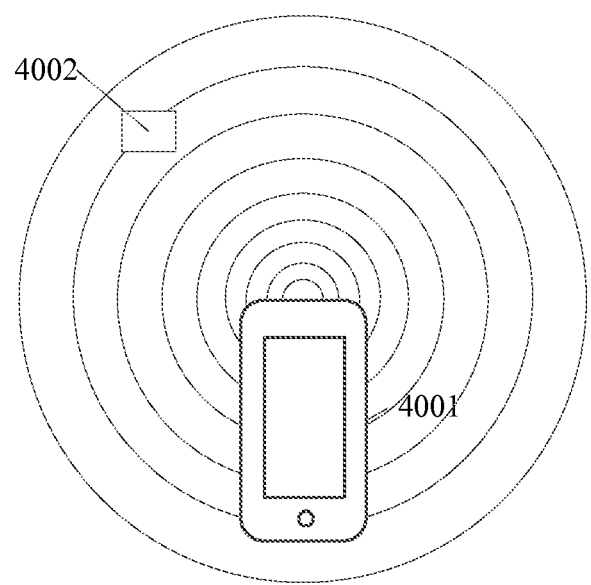
FIG. 4B is a schematic diagram illustrating that a beam is transmitted out from a positioning device according to another exemplary embodiment.

For example, as shown in FIG. 4B, which is a schematic diagram illustrating that a beam is transmitted outward from a positioning device according to an exemplary embodiment. As shown in FIG. 4B, a positioning device 4001 transmits beams outward with a beam angle of 360°, i.e., the positioning device transmits the beam toward all directions. After receiving the beam transmitted by the positioning device 4001, an object 4002 sends a feedback signal to the positioning device 4001.

In Step 402, a feedback signal sent by the object is received.

The object is provided with an electronic tag which may feedback, after receiving a beam transmitted by the positioning device, a corresponding feedback signal to the positioning device according to the intensity of the received beam. The electronic tag may be an active tag or a passive tag, to which the embodiment makes no restriction.

In Step 403, the distance between the object and the master positioning device is calculated according to beam intensity correlating to the feedback signal.

The electronic tag may feedback a corresponding feedback signal to the positioning device according to the intensity of a received beam, and the intensity of a beam may diminish gradually during propagation, i.e., the greater the propagation distance is, the lower the beam intensity is. Therefore, the positioning device may calculate, according to the beam intensity correlating to the received feedback signal, the distance between the object and the master positioning device.

In Step 404, the distance, sent by at least one slave positioning device, between the slave positioning device and the object is received.

The slave positioning device may also calculate the distance between the object and the slave positioning device according to Step 403. After acquiring the distance, the slave positioning device sends the distance to the master positioning device. The master positioning device receives a distance between each slave positioning device and the object.

In Step 405, a circle with each positioning device as the center and the distance between the positioning device and the object determined by the device as the radius is respectively determined according to the relative position between at the least one slave positioning device and the master positioning device as well as the distance, which is measured from each of the slave positioning devices to the object.

The relative position between each slave positioning device and the master positioning device is stored in advance in the master positioning device.

After receiving a distance between each slave positioning device and the object, the master positioning device determines respectively, according to the relative position between each slave positioning device and the master positioning device as well as the distance between each slave positioning device and the object measured by the slave positioning device, a circle with each positioning device as the center and the distance between each positioning device and the object determined by the positioning device as the radius.

In Step 406, when the circle corresponding to the master positioning device intersects with more than two circles each of which corresponds to one of the slave positioning devices at an multi-circle intersection point, the position of the multi-circle intersection point is determined as the position of the object relative to the master positioning device.

Figure 4C:
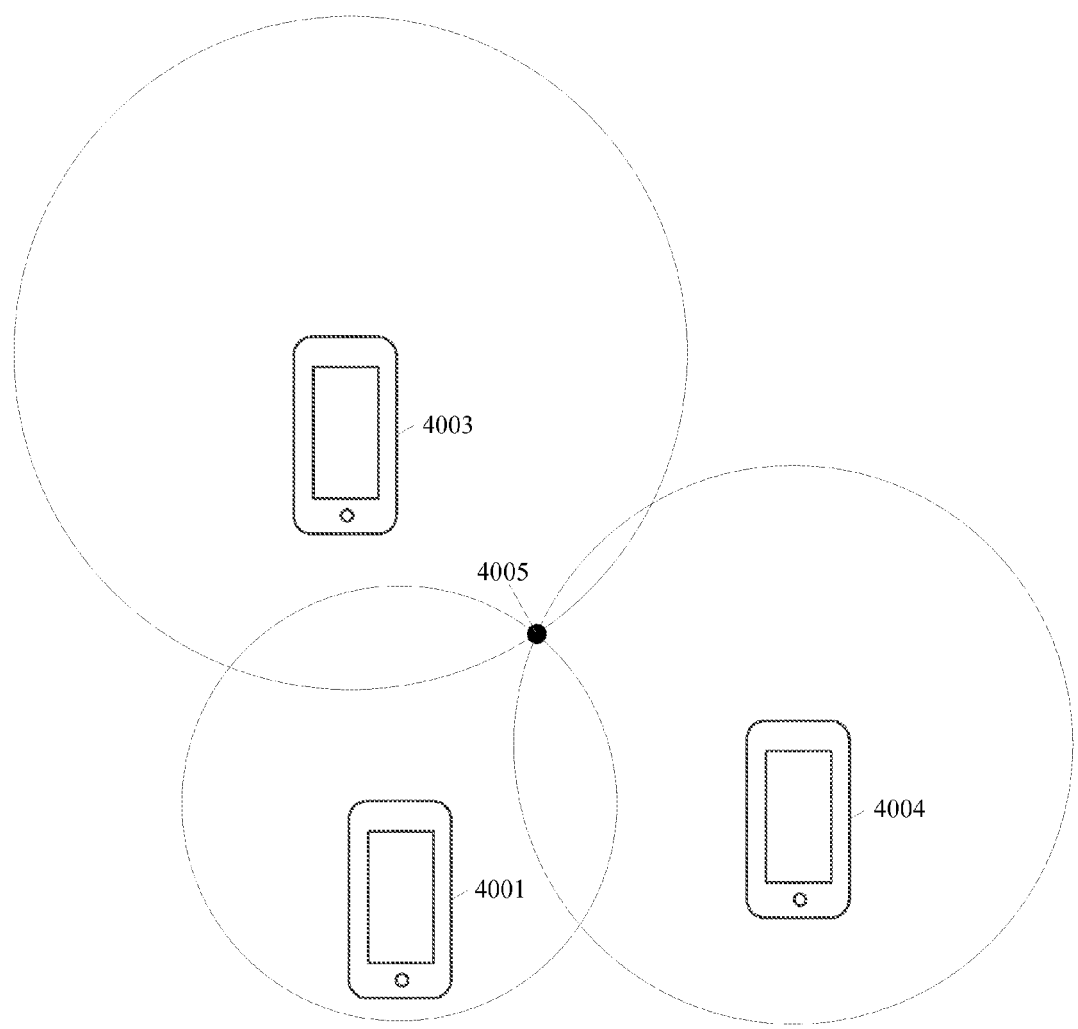
FIG. 4C is a schematic diagram illustrating that an object is positioned by a positioning device according to another exemplary embodiment.

For example, please refer to FIG. 4C, which is a schematic diagram illustrating that an object is positioned by a positioning device according to another exemplary embodiment. As shown in FIG. 4C, a circle determined by a master positioning device 4001 and circles determined by slave positioning devices 4003 and 4004 intersect at a point 4005. At the moment, the master positioning device determines the intersection point 4005 as the position of the object relative to the master positioning device.

In Step 407, when there is no such of the multi-circle intersection point, if the circle corresponding to the master positioning device intersects with the circles corresponding to the at least of one slave positioning device at a plurality of double-circle intersection points and there is such an arc formed by two of the double-circle intersection points that the angle of the arc is less than a predetermined angle threshold, on the circle corresponding to the master positioning device, the position of either of the two double-circle intersection points is determined as the position of the object relative to the master positioning device.

On the other hand, if an arc formed by any two of the double-circle intersection points on the circle corresponding to the master positioning device is greater than the predetermined angle threshold, and if there is such one of the double-circle intersection points that there is a second intersection point on the circle corresponding to a slave positioning device which creates the one of the double-circle intersection point and an arc formed by the one of the double-circle intersection points and the second intersection point on the circle corresponding to the slave positioning device is less than the predetermined angle threshold, the position of the one of double-circle intersection points on the master positioning device is determined as the position of the object relative to the master positioning device.

During the positioning process, positioning error may occur due to the differences in size of objects to be positioned, i.e., when a circle is determined according to the positioning device as well as the distance between the positioning device and an object, the circle determined usually has some errors. Therefore, a predetermined angle threshold may be set to ensure accurate positioning under errors.

In the first case, when there is no such of the multi-circle intersection point, if the circle corresponding to the master positioning device intersects with the circles each of which corresponds to one slave positioning device at a plurality of double-circle intersection points and there is such an arc formed by two of the double-circle intersection points that the angle of the arc is less than the predetermined angle threshold, on the circle corresponding to the master positioning device, the position of either of the two double-circle intersection points is determined as the position of the object relative to the master positioning device. Namely, when the arc formed by the two double-circle intersection points on the circle corresponding to the master positioning device is less than the predetermined angle threshold, the positioning requirement is met and the position of either of the two double-circle intersection points is determined as the position of the object relative to the master positioning device.

Figure 4D:
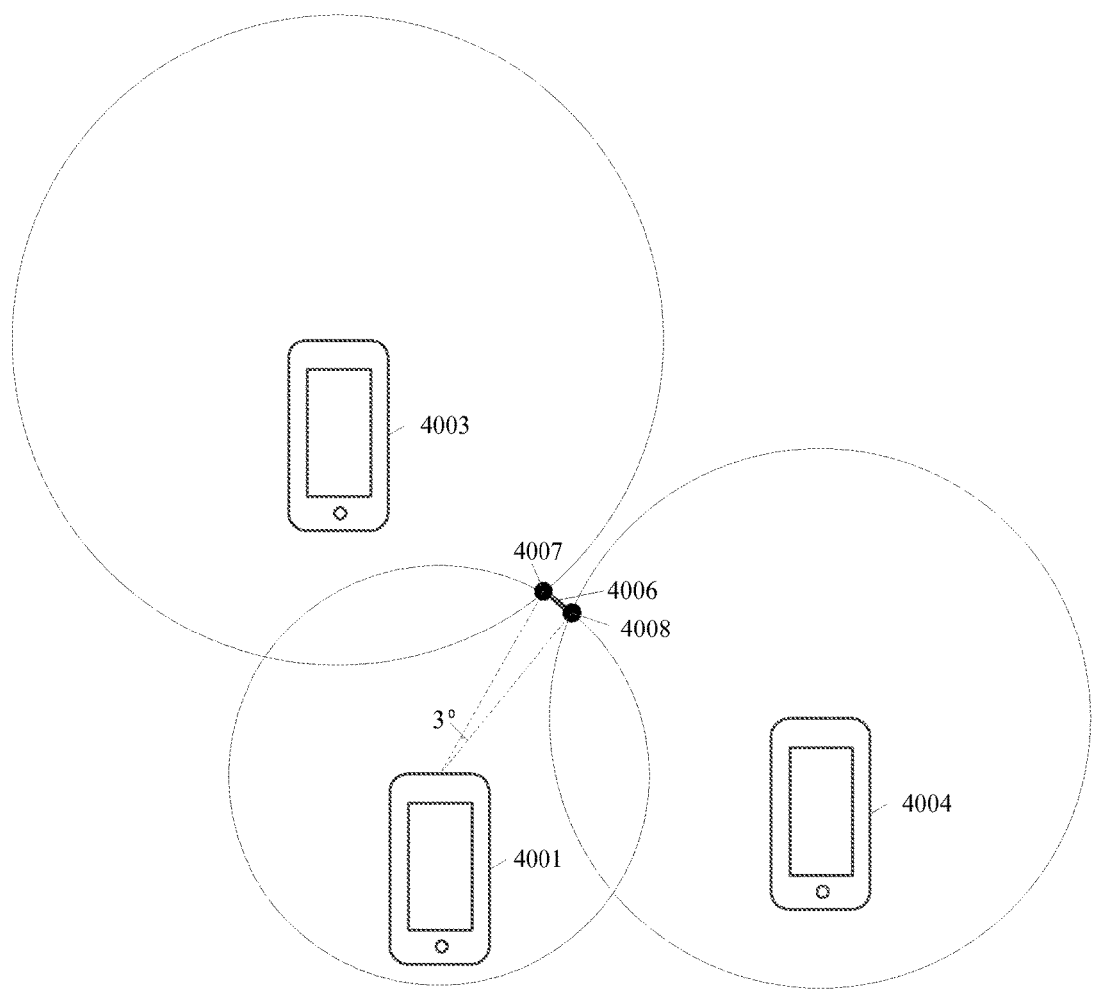
FIG. 4D is a schematic diagram illustrating that an object is positioned by a positioning device according to a further exemplary embodiment.

For example, please refer to FIG. 4D, which is a schematic diagram illustrating that an object is positioned by a positioning device according to a further exemplary embodiment. As shown in FIG. 4D, the predetermined arc threshold is 5°. The circle corresponding to the master positioning device 4001 and the circle corresponding to the slave positioning devices 4003 intersect at a point 4007. The circle corresponding to the master positioning device 4001 and the circle corresponding to the slave positioning device 4004 intersect at a point 4008. Here, the angle of an arc 4006 between the intersection point 4007 and the intersection point 4008 is 3° which is smaller than 5°. So the master positioning device determines the position of the intersection point 4007 to be the position of the object relative to the master positioning device.

In the second case, when there is no such of the multi-circle intersection point, if the circle corresponding to the master positioning device intersects with the circles each of which corresponds to one slave positioning device at a plurality of double-circle intersection points and if an arc formed by any two double-circle intersection points on the circle corresponding to the master positioning device is greater than the predetermined angle threshold, and if there is such one of the double-circle intersection points that there is a second intersection point on the circle corresponding to a slave positioning device which creates the one of the double-circle intersection point and an arc formed by the one of the double-circle intersection points and the second intersection point on the circle corresponding to the slave positioning device is less than the predetermined angle threshold, the position of the one of the double-circle intersection point on the master positioning device is determined as the position of the object relative to the master positioning device. Herein the second intersection point is the intersection point of the circle corresponding to the slave positioning device which creates the one of the double-circle intersection point and the circle corresponding to other slave device.

Figure 4E:
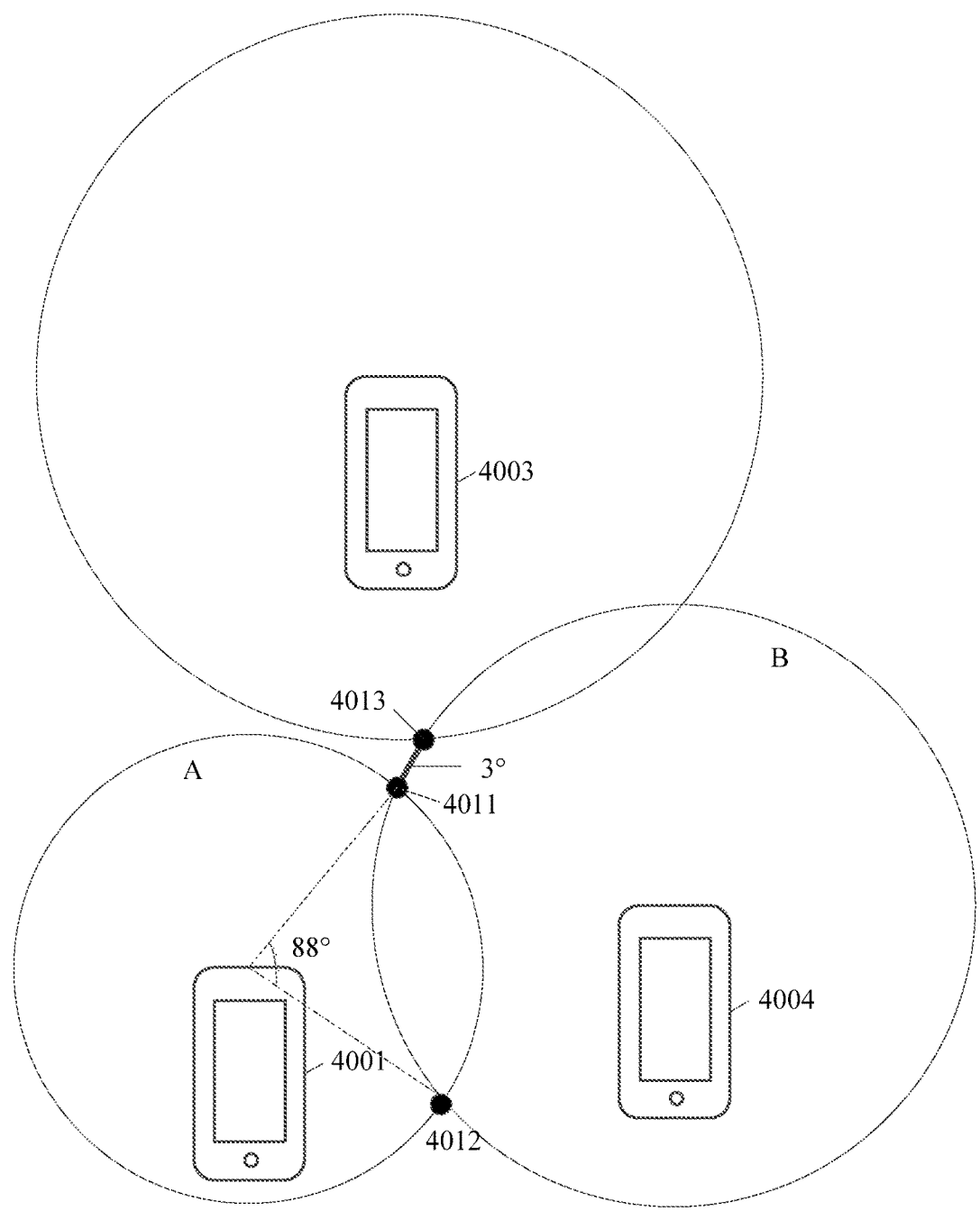
FIG. 4E is a schematic diagram illustrating that an object is positioned by a positioning device according to a still further exemplary embodiment.

For example, please refer to FIG. 4E, which is a schematic diagram illustrating that an object is positioned by a positioning device according to a still further exemplary embodiment. As shown in FIG. 4E, the predetermined arc threshold is 5°. The circle A corresponding to the master positioning device 4001 and circles each of which corresponds to a slave positioning devices intersect at point 4011 and point 4012. However, the angle of an arc formed by the intersection point 4011 and the intersection point 4012 is 88° which is greater than the predetermined angle threshold 5°. Therefore, one of the intersection points 4011 may be selected, and a circle B corresponding to a slave positioning device intersecting with the intersection point 4011 is determined, then the angle of an arc formed by an intersection point 4013 on the circle B and the intersection point 4011 is determined to be 3° which is smaller than the predetermined angle threshold 5°. Therefore, the position of the intersection point 4011 is determined to be the position of the object relative to the master positioning device 4001.

In summary, according to the positioning method provided by embodiments of the present disclosure, the position of an object relative to a positioning device is determined by transmitting a beam according to a preset mode, receiving a feedback signal sent by the object, and determining the position according to the feedback signal; articles are positioned by means of the positioning device, thus the problem of cumbersome operation that users need to manually record storing locations of the articles on a logbook can be solved and the effect of improving the convenience and reliability for positioning objects can be achieved.

According to the positioning method provided by the embodiments of the present disclosure, an object is positioned by at least two positioning devices, thus the problem of low positioning accuracy due to a single positioning device can be solved, and the effect of improving object positioning accuracy can be achieved.

An apparatus embodiment of the present disclosure is given as follows, which may be employed to implement the method embodiments of the present disclosure. Please refer to the method embodiments of the present disclosure for details undisclosed in the device embodiment of the present disclosure.

Figure 5:
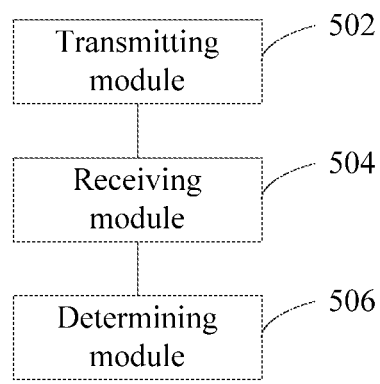
FIG. 5 is a block diagram illustrating a positioning apparatus according to an exemplary embodiment.

FIG. 5 is a block diagram illustrating a positioning apparatus according to an exemplary embodiment. As shown in FIG. 5, the positioning apparatus is applied in the positioning device 120 in the implementation environment as shown in FIG. 1. The positioning apparatus may include but is not limited to: a transmitting module 502, a receiving module 504 and a determining module 506.

The transmitting module 502 is configured to transmit a beam according to a preset mode.

The receiving module 504 is configured to receive a feedback signal sent by an object; the feedback signal is a signal sent by an electronic tag on the object after receiving the beam, and the feedback signal correlates to an intensity of the beam when the electronic tag receives the beam.

The determining module 506 is configured to determine the position of the object relative to the positioning device according to the feedback signal.

In summary, according to the positioning apparatus provided by embodiments of the present disclosure, the position of an object relative to a positioning device is determined by transmitting a beam according to a preset mode, receiving a feedback signal sent by the object, and determining the position according to the feedback signal; articles are positioned by means of the positioning device, thus the problem of cumbersome operation that users need to manually record storing locations of the articles on a logbook can be solved, and the effect of improving the convenience and reliability for positioning objects can be achieved.

Figure 6:
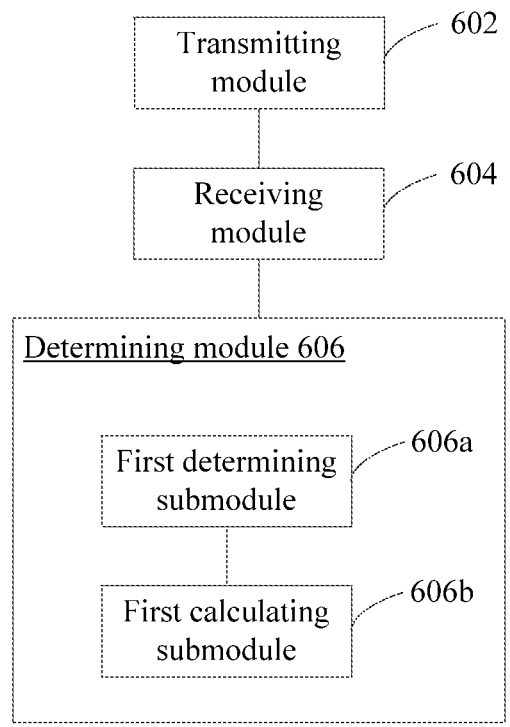
FIG. 6 is a block diagram illustrating a positioning apparatus according to another exemplary embodiment.

FIG. 6 is a block diagram illustrating the positioning apparatus according to another exemplary embodiment. As shown in FIG. 6, the positioning apparatus is applied in the positioning device 120 in the implementation environment as shown in FIG. 1. The positioning apparatus may include but is not limited to: a transmitting module 602, a receiving module 604 and a determining module 606.

The transmitting module 602 is configured to transmit a beam according to a preset mode.

The receiving module 604 is configured to receive a feedback signal sent by an object; the feedback signal is a signal sent by an electronic tag on the object after receiving the beam, and the feedback signal correlates to an intensity of the beam when the electronic tag receives the beam.

The determining module 606 is configured to determine the position of the object relative to the positioning device according to the feedback signal.

In a possible embodiment, the transmitting module 602 is configured to: deflect a previous transmitting direction by a predetermined angle towards a predetermined direction at predefined time intervals so as to acquire a current transmitting direction, and transmit the beam along the current transmitting direction until the feedback signal is received, or until the current transmitting direction is the same as an initial transmitting direction.

In a possible embodiment, the determining module 606 may include: a first determining submodule 606a and a first calculating submodule 606b.

The first determining submodule 606a is configured to determine the transmitting direction of the beam currently transmitted by the positioning device when the feedback signal is received, and to determine the direction of the object relative to the positioning device according to the transmitting direction.

The first calculating submodule 606b is configured to calculate the distance between the object and the positioning device according to the intensity of the beam correlating to the feedback signal.

In summary, according to the positioning apparatus provided by embodiments of the present disclosure, the position of an object relative to a positioning device is determined by transmitting a beam according to a preset mode, receiving a feedback signal sent by the object, and determining the position according to the feedback signal; articles are positioned by means of the positioning device, thus the problem of cumbersome operation that users need to manually record storing locations of the articles on a logbook can be solved and the effect of improving the convenience and reliability for positioning objects can be achieved.

Figure 7:
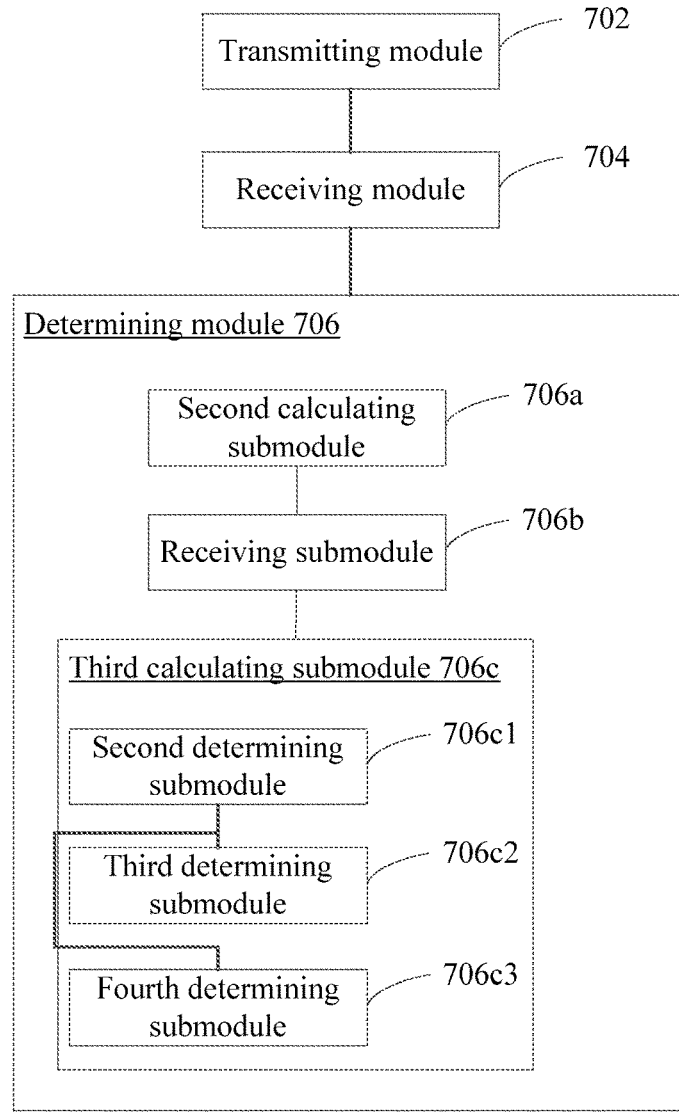
FIG. 7 is a block diagram illustrating a positioning apparatus according to a further exemplary embodiment.

FIG. 7 is a block diagram illustrating the positioning apparatus according to a further exemplary embodiment. As shown in FIG. 7, the positioning apparatus is applied in the positioning device 120 in the implementation environment as shown in FIG. 1. The positioning apparatus may include but is not limited to: a transmitting module 702, a receiving module 704 and a determining module 706.

The transmitting module 702 is configured to transmit a beam according to a preset mode.

The receiving module 704 is configured to receive a feedback signal sent by an object; the feedback signal is a signal sent by an electronic tag on the object after receiving the beam, and the feedback signal correlates to an intensity of the beam when the electronic tag receives the beam.

The determining module 706 is configured to determine the position of the object relative to the positioning device according to the feedback signal.

In a possible embodiment, the transmitting module 702 is configured to transmit a beam with a beam angle of 360° outward.

In a possible embodiment, the positioning device is a master positioning device, and the determining module 706 may include a second calculating submodule 706a, a receiving submodule 706b and a third calculating submodule 706c.

The second calculating submodule 706b is configured to calculate the distance between the object and the master positioning device according to the beam intensity correlating to the feedback signal.

The receiving submodule 706b is configured to receive the distance sent by at least one slave positioning device between the device and the object.

The third calculating submodule 706c is configured to calculate the position of the object relative to the master positioning device according to the relative position between at least one slave positioning device and the master positioning device as well as the distance measured by each slave positioning device between the slave device and the object.

In a possible embodiment, the third calculating submodule 706c may include: a second determining submodule 706c1, a third determining submodule 706c2 and a fourth determining submodule 706c3.

The second determining submodule 706c1 is configured to determine respectively, according to the relative position between at the least one slave positioning device and the master positioning device as well as the distance, which is measured by each slave positioning device, between the slave positioning device and the object, a circle respectively taking each positioning device as a center and taking a distance, which is determined by each positioning device, between the device and the object as a radius. Relative positions are provided among circles corresponding to various positioning devices.

The third determining submodule 706c2 is configured to determine, when the circle corresponding to the master positioning device intersects with more than two circles each of which corresponds to a slave positioning device at a multi-circle intersection point, the position of the multi-circle intersection point to be the position of the object relative to the master positioning device.

The fourth determining submodule 706c3 is configured to determine, when there is no such of the multi-circle intersection point, if the circle corresponding to the master positioning device intersects with the circles each of which corresponds to a slave positioning device at a plurality of double-circle intersection points and there is such an arc formed by two of the double-circle intersection points that the angle of the arc is less than a predetermined angle threshold, on the circle corresponding to the master positioning device, the position of either of the two double-circle intersection points as the position of the object relative to the master positioning device; to determine, if an arc formed by any two of the double-circle intersection points on the circle corresponding to the master positioning device is greater than the predetermined angle threshold, and if there is such one of the double-circle intersection points that there is a second intersection point on the circle corresponding to a slave positioning device which creates the one of the double-circle intersection points and an arc formed by the one of the double-circle intersection points and the second intersection point on the circle corresponding to the slave positioning device is less than the predetermined arc threshold on the another circle; and to determine, the position of the one of the double-circle intersection points on the master positioning device as the position of the object relative to the master positioning device. Herein the second intersection point is the intersection point of the circle corresponding to the slave positioning device which creates the one of the double-circle intersection points and the circle corresponding to other slave device.

In summary, according to the positioning apparatus provided by embodiments of the present disclosure, the position of an object relative to a positioning device is determined by transmitting a beam according to a preset mode, receiving a feedback signal sent by the object, and determining the position according to the feedback signal; articles are positioned by means of the positioning device, thus the problem of cumbersome operation that users need to manually record storing locations of the articles on a logbook can be solved and the effect of improving the convenience and reliability for positioning objects can be achieved.

With regard to the apparatuses in the above embodiments, detailed description of specific modes for conducting operation of modules has been made in the embodiments related to the method, thus detailed illustration will be omitted herein.

The following embodiments are system embodiments of the present disclosure, which may be configured to execute the method embodiments of the present disclosure. Please refer to the embodiments of the method in the present disclosure for details undisclosed in the system embodiments of the present disclosure.

Figure 8:
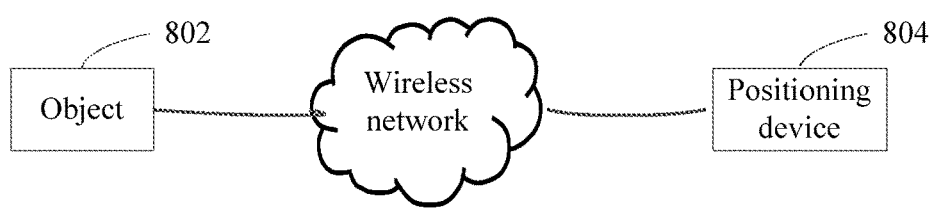
FIG. 8 is a block diagram illustrating a positioning system according to an exemplary embodiment.

FIG. 8 is a block diagram illustrating a positioning system according to an exemplary embodiment. As shown in FIG. 8, the positioning system is applied in the implementation environment as shown in FIG. 1. The system includes an object 802 and a positioning device 804.

The object 802 is provided with an electronic tag for receiving a beam sent by the positioning device.

The positioning device 804 may include the positioning devices as depicted in FIG. 5 or FIG. 6.

In summary, according to the positioning system provided by embodiments of the present disclosure, the position of an object relative to a positioning device is determined by transmitting a beam according to a preset mode, receiving a feedback signal sent by the object, and determining the position according to the feedback signal; articles are positioned by means of the positioning device, thus the problem of cumbersome operation that users need to manually record storing locations of the articles on a logbook can be solved and the effect of improving the convenience and reliability for positioning objects can be achieved.

Figure 9:
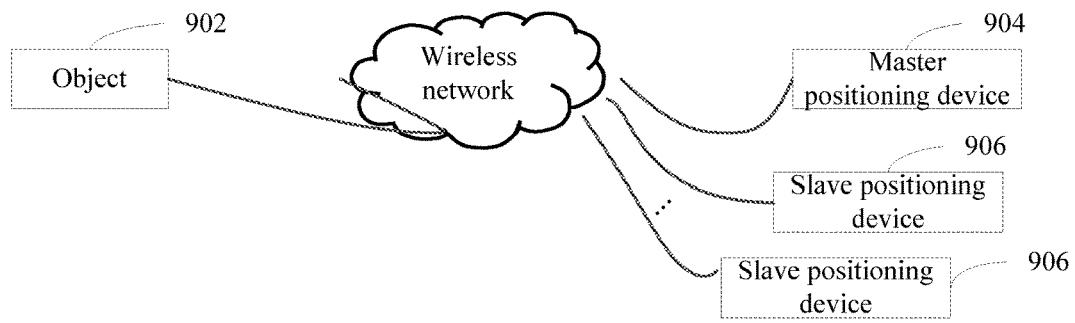
FIG. 9 is a block diagram illustrating a positioning system according to another exemplary embodiment.

FIG. 9 is a block diagram illustrating a positioning system according to another exemplary embodiment. As shown in FIG. 9, the positioning system is applied in the implementation environment as shown in FIG. 1. The system includes an object 902, a master positioning device 904 and at least two slave positioning devices 906.

The object 902 is provided with an electronic tag for receiving a beam sent by the positioning device.

The master positioning device 904 may include the positioning devices as depicted in FIG. 5 or FIG. 7. The slave positioning devices 906 are slave positioning devices as depicted in the positioning devices in FIG. 5 or FIG. 7.

In summary, according to the positioning system provided by embodiments of the present disclosure, the position of an object relative to a positioning device is determined by transmitting a beam according to a preset mode, receiving a feedback signal sent by the object, and determining the position according to the feedback signal; articles are positioned by means of the positioning device, thus the problem of cumbersome operation that users need to manually record storing locations of the articles on a logbook can be solved and the effect of improving the convenience and reliability for positioning objects can be achieved.

An exemplary embodiment of the present disclosure provides a positioning device, which is able to implement the positioning method provided by the present disclosure. The positioning device includes: a processor and a memory configured to store processor-executable instructions.

Herein, the processor is configured to: transmit a beam according to a preset mode; receive a feedback signal sent by an object, the feedback signal is signal sent by an electronic tag on the object after receiving the beam, and the feedback signal correlates to an intensity of the beam when the electronic tag receives the beam; and determine the position of the object relative to the positioning device according to the feedback signal.

Figure 10:
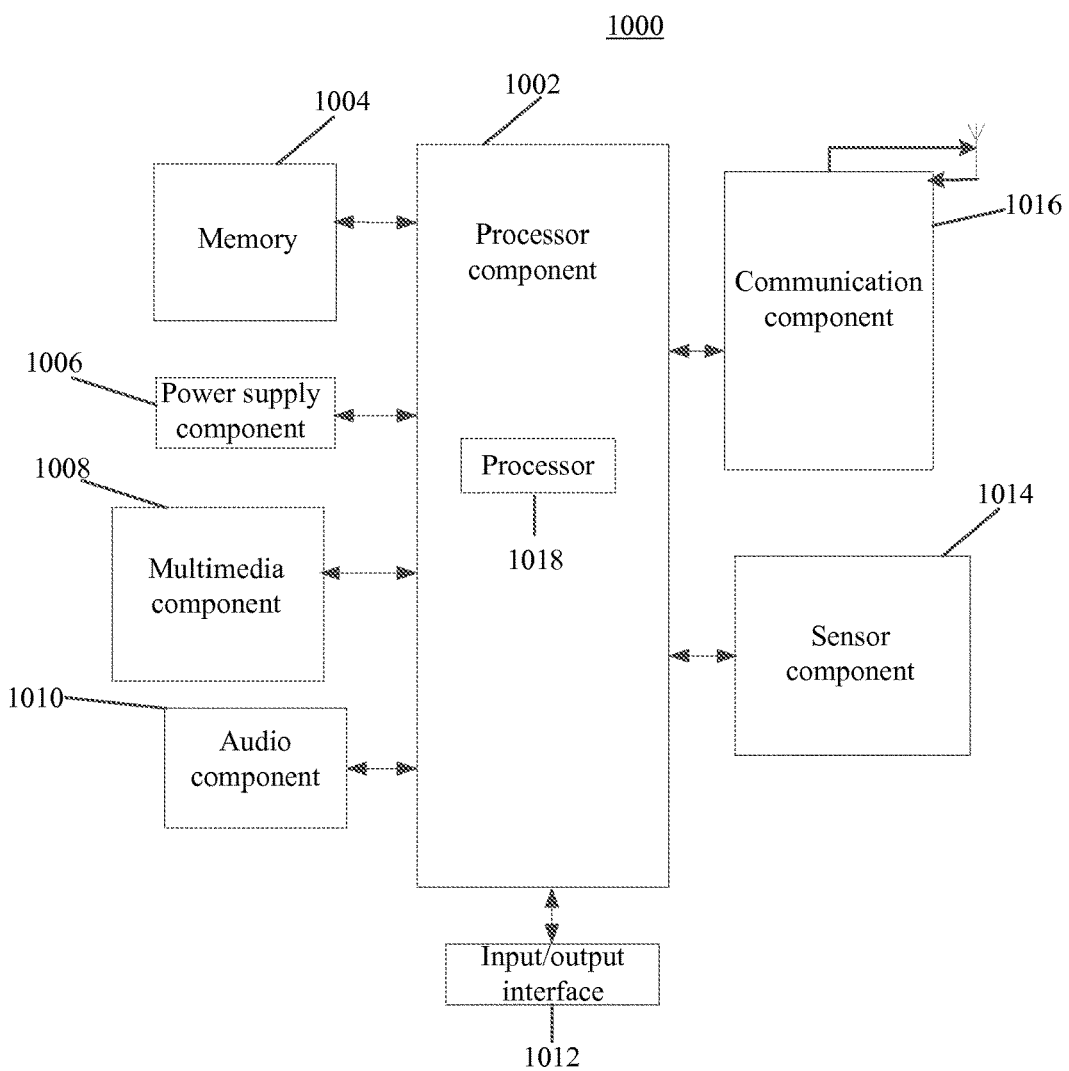
FIG. 10 is a block diagram illustrating a positioning device for object positioning according to an exemplary embodiment.

FIG. 10 is a block diagram of a positioning device to position an object according to an exemplary embodiment. For example, the positioning device 1000 may be a mobile telephone, a computer, a digital broadcasting terminal, a message transceiver device, a game console, a tablet device, a medical device, a fitness facility, a personal digital assistant (PDA) or the like.

Referring to FIG. 10, the positioning device 1000 may include one or a plurality of components as below: a processor component 1002, a memory 1004, a power supply component 1006, a multimedia component 1008, an audio component 1010, an input/output (I/O) interface 1012, a sensor component 1014 and a communication component 1016.

The processor component 1002 generally controls overall operation of the positioning device 1000, such as display, telephone call, data communication, and operation associated with camera operation and record operation. The processor component 1002 may include one or a plurality of processors 1018 for executing instructions so as to complete steps of above methods in part or in whole. In addition, the processor component 1002 may include one or a plurality of modules for the purpose of interaction between the processor component 1002 and other components. For example, the processor component 1002 may include a multimedia module for the purpose of interaction between the multimedia component 1008 and the processor component 1002.

The memory 1004 is configured to store various types of data so as to support the operation of the positioning device 1000. Examples of the data include instructions of any application program or approach for operation on the positioning device 1000, contact data, phonebook data, message, picture and video, etc. The memory 1004 may be implemented by any type of volatile or non-volatile memory device or combinations thereof, such as static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power supply component 1006 supplies power for various components of the positioning device 1000. The power supply component 1006 may include a power management system, one or a plurality of power supplies, and other components associated with generation, management and distribution of power for the positioning device 1000.

The multimedia component 1008 includes a screen between the positioning device 1000 and a user for providing an output interface. In some embodiments, the screen may include an LCD (Liquid Crystal Display) and a touch panel (TP). If the screen includes a touch panel, the screen may be implemented as a touch screen for receiving input signals from users. The touch panel includes one or a plurality of touch sensors for sensing of touching, sliding and gestures on the touch panel. The touch sensor not only can sensor trip boundary of touching or sliding, but also can detect the duration and pressure related to the touching or sliding operation. In some embodiments, the multimedia component 1008 includes a front-facing camera and/or a rear-facing camera. When the positioning device 1000 is under an operation mode such as capture mode or video mode, the front-facing camera and/or the rear-facing camera may receive external multimedia data. Each of front-facing camera and rear-facing camera may be a fixed optical lens system or may have focal length and optical zoom capacity.

The audio component 1010 is configured to output and/or input audio signal. For example, the audio component 1010 includes a microphone (MIC); when the positioning device 1000 is under an operation mode such as call mode, record mode and speech recognition mode, the microphone is configured to receive external audio signal. The audio signal received may be further stored in the memory 1004 or sent out by the communication component 1016. In some embodiments, the audio component 1010 also includes a loudspeaker for outputting audio signal.

The I/O interface 1012 provides interface between the processor component 1002 and peripheral interface modules, the peripheral interface modules may be a keyboard, a click wheel or buttons, etc. These buttons may include but not limited to: home button, volume button, start button and locking button.

The sensor component 1014 includes one or a plurality of sensors for providing the positioning device 1000 with state evaluation from all aspects. For example, the sensor component 1014 may detect the on/off state of the positioning device 1000, relative positioning of components, for example, the components include the displayer and keypads of the positioning device 1000; the sensor component 1014 may also detect the position change of the positioning device 1000 or a component thereof, the presence or absence of users' touch on the positioning device 1000, the direction or acceleration/deceleration of the positioning device 1000, and temperature variation of the positioning device 1000. The sensor component 1014 may also include a proximity detector, which is configured to detect the presence of nearby objects without physical touch. The sensor component 1014 may also include an optical sensor such as CMOS or CCD image sensor for imaging application. In some embodiments, the sensor component 1014 may also include an acceleration sensor, a gyro sensor, a magnetic sensor, a pressure sensor, or a temperature sensor.

The communication component 1016 is configured to facilitate wired communication or wireless communication between the positioning device 1000 and other equipments. The positioning device 1000 is available for access to wireless networks based on communication standards, for example, WiFi, 2G or 3G, or combinations thereof. In an exemplary embodiment, the communication component 1016 receives by means of a broadcast channel the broadcast signal or broadcast-related information from external broadcast management systems. In an exemplary embodiment, the communication component 1016 also includes a near field communication (NFC) module for promoting short-range communication. For example, the NFC module may be implemented on the basis of Radio Frequency Identification (RFID) Technology, Infrared Data Association (IrDA) Technology, Ultra-wide Bandwidth (UWB) Technology, Bluetooth (BT) Technology and other technologies.

In exemplary embodiments, the positioning device 1000 may be implemented by one or a plurality of application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, and configured to execute the above object positioning methods.

In exemplary embodiments, a non-transitory computer-readable storage medium including instructions is also provided, for example, a memory 1004 including instructions which may be executed by the processor 1018 of the positioning device 1000 so as to implement the above object positioning methods. For example, the non-transitory computer-readable storage medium may be ROM, random access memory (RAM), CD-ROM, a magnetic tape, a floppy disk and an optical data storage device, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for positioning an object, applied to a master positioning device, comprising:

transmitting a beam outward with a beam angle of 360°;

receiving a feedback signal sent from the object, wherein the feedback signal is a signal sent by an electronic tag on the object after receiving the beam, and the feedback signal correlates to an intensity of the beam when the electronic tag receives the beam;

calculating a distance between the object and the master positioning device according to the beam intensity correlating to the feedback signal;

receiving respective distances, which are measured and sent from at least two slave positioning devices, between the object and the at least two slave positioning devices;

determining, according to respective relative positions between the at least two slave positioning devices and the master positioning device and the respective distances between the at least two slave positioning devices and the object, a circle centered at the master positioning device and having a radius being the distance between the object and the master positioning device, and at least two respective circles each centered at one of the at least two slave positioning devices and having a radius being the distance between the object and the one of the at least two slave positioning devices;

determining whether the circle centered at the master positioning device intersects with at least two of the circles centered at the slave positioning devices at a multi-circle intersection point;

determining, when there is no such of the multi-circle intersection point and the circle centered at the master positioning device intersects with the circles centered at the slave positioning devices at a plurality of double-circle intersection points, whether there is such an arc formed by two of the plurality of double-circle intersection points that the angle of the arc is less than a predetermined angle threshold on the circle centered at the master positioning device; and determining, when there is no such of the arc formed by two of the plurality of double-circle intersection points, if there is such one of the plurality of double-circle intersection points that there is a second intersection point on the circle centered at a slave positioning device which creates the one of the plurality of double-circle intersection points and an arc formed by the one of the plurality of double-circle intersection points and the second intersection point is less than the predetermined angle threshold, a position of the one of the plurality of double-circle intersection points on the master positioning device as the position of the object relative to the master positioning device, wherein the second intersection point is the intersection point of the circle centered at the slave positioning device which creates the one of the plurality of double-circle intersection points and a circle centered at other slave positioning device.

2. The method of claim 1, further comprising:
determining, when there is such of the multi-circle intersection point, a position of the multi-circle intersection point as the position of the object relative to the master positioning device.

3. The method of claim 1, further comprising:
determining, when there is no such of the multi-circle intersection point but there is such of the arc formed by two of the plurality of double-circle intersection points that the angle of the arc is less than a predetermined angle threshold on the circle centered at the master positioning device, a position of either of the two double-circle intersection points as the position of the object relative to the master positioning device.

4. A master positioning device for positioning an object, the master positioning device comprising:
a processor; and
a memory configured to store processor-executable instructions;
the processor is configured to perform:
transmitting a bream outward with a beam angle of 360°;
receiving a feedback signal sent from the object, wherein the feedback signal is a signal sent by an electronic tag on the object after receiving the beam, and the feedback signal correlates to an intensity of the beam when the electronic tag receives the beam;
calculating a distance between the object and the master positioning device according to the beam intensity correlating to the feedback signal;
receiving respective distances, which are measured and sent from at least two slave positioning devices, between the object and the at least two slave positioning devices;
determining, according to respective relative positions between the at least two slave positioning devices and the master positioning device and the respective distances between the at least two slave positioning devices and the object, a circle centered at the master positioning device and having a radius being the distance between the object and the master positioning device, and at least two respective circles each centered at one of the at least two slave positioning devices and having a radius being the distance between the object and the one of the at least two slave positioning devices;
determining whether the circle centered at the master positioning device intersects with at least two of the circles centered at the slave positioning devices at a multi-circle intersection point;
determining, when there is no such of the multi-circle intersection point and the circle centered at the master positioning device intersects with the circles centered at the slave positioning devices at a plurality of double-circle intersection points, whether there is such an arc formed by two of the plurality of double-circle intersection points that the angle of the arc is less than a predetermined angle threshold on the circle centered at the master positioning device; and
determining, when there is no such of the arc formed by two of the plurality of double-circle intersection points, if there is such one of the plurality of double-circle intersection points that there is a second intersection point on the circle centered at a slave positioning device which creates the one of the plurality of double-circle intersection points and an arc formed by the one of the plurality of double-circle intersection points and the second intersection point is less than the predetermined angle threshold, a position of the one of the plurality of double-circle intersection points on the master positioning device as the position of the object relative to the master positioning device,
wherein the second intersection point is the intersection point of the circle centered at the slave positioning device which creates the one of the plurality of double-circle intersection points and a circle centered at other slave positioning device.

5. The positioning device of claim 4, the processor is further configured to perform:
determining, when there is such of the multi-circle intersection point, a position of the multi-circle intersection point as the position of the object relative to the master positioning device.

6. The positioning device of claim 4, the processor is further configured to perform:
determining, when there is no such of the multi-circle intersection point but there is such of the arc formed by two of the plurality of double-circle intersection points that the angle of the arc is less than a predetermined angle threshold on the circle centered at the master positioning device, a position of either of the two double-circle intersection points as the position of the object relative to the master positioning device.

7. An object positioning system, wherein the system comprises an electronic tag, a master positioning device and at least two slave positioning devices, wherein the electronic tag is provided on an object to receive a beam sent from the positioning device, and the master positioning device comprises:
a processor; and
a memory configured to store processor-executable instructions;
the processor is configured to perform:
transmitting the beam outward with a beam angle of 360°;
receiving a feedback signal sent from the object, wherein the feedback signal is a signal sent by the electronic tag on the object after receiving the beam, and the feedback signal correlates to an intensity of the beam when the electronic tag receives the beam;
calculating a distance between the object and the master positioning device according to the beam intensity correlating to the feedback signal;
receiving respective distances, which are measured and sent from at least two slave positioning devices, between the object and the at least two slave positioning devices;
determining, according to respective relative positions between the at least two slave positioning devices and the master positioning device and the respective distances between the at least two slave positioning devices and the object, a circle centered at the master positioning device and having a radius being the distance between the object and the master positioning device, and at least two respective circles each centered at one of the at least two slave positioning devices and having a radius being the distance between the object and the one of the at least two slave positioning devices;

determining whether the circle centered at the master positioning device intersects with at least two of the circles centered at the slave positioning devices at a multi-circle intersection point;

determining, when there is no such of the multi-circle intersection point and the circle centered at the master positioning device intersects with the circles centered at the slave positioning devices at a plurality of double-circle intersection points, whether there is such an arc formed by two of the plurality of double-circle intersection points that the angle of the arc is less than a predetermined angle threshold on the circle centered at the master positioning device; and determining, when there is no such of the arc formed by two of the plurality of double-circle intersection points, if there is such one of the plurality of double-circle intersection points that there is a second intersection point on the circle centered at a slave positioning device which creates the one of the plurality of double-circle intersection points and an arc formed by the one of the plurality of double-circle intersection points and the second intersection point is less than the predetermined angle threshold, a position of the one of the plurality of double-circle intersection points on the master positioning device as the position of the object relative to the master positioning device, wherein the second intersection point is the intersection point of the circle centered at the slave positioning device which creates the one of the plurality of double-circle intersection points and a circle centered at other slave positioning device.

* * * * *